(12) United States Patent
Aizawa et al.

(10) Patent No.: US 10,599,125 B2
(45) Date of Patent: Mar. 24, 2020

(54) NUMERICAL CONTROLLER

(71) Applicant: FANUC CORPORATION, Minamitsuru-gun, Yamanashi (JP)

(72) Inventors: Nobuaki Aizawa, Yamanashi (JP); Shouki Tani, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 176 days.

(21) Appl. No.: 15/928,555

(22) Filed: Mar. 22, 2018

(65) Prior Publication Data
US 2018/0275626 A1    Sep. 27, 2018

(30) Foreign Application Priority Data

Mar. 24, 2017   (JP) .................................. 2017-059913
Jun. 7, 2017    (JP) .................................. 2017-112928

(51) Int. Cl.
*G05B 19/19*     (2006.01)
*G05B 19/404*    (2006.01)
(Continued)

(52) U.S. Cl.
CPC .... *G05B 19/19* (2013.01); *G05B 2219/37077* (2013.01); *G05B 2219/37347* (2013.01); *G05B 2219/45044* (2013.01)

(58) Field of Classification Search
CPC .............. G05B 19/404; G05B 19/4097; G05B 19/4099; G05B 2219/35187;
(Continued)

(56) References Cited

U.S. PATENT DOCUMENTS

| 8,688,257 B2* | 4/2014 | Kommareddy .... G05B 19/4093 700/173 |
| 2002/0055805 A1* | 5/2002 | Matsumoto ........ G05B 19/4163 700/160 |

(Continued)

FOREIGN PATENT DOCUMENTS

| JP | H05237740 A | 9/1993 |
| JP | H07276187 A | 10/1995 |

(Continued)

OTHER PUBLICATIONS

Japanese Decision to Grant a Patent for Japanese Application No. 2017-112928, dated Mar. 19, 2019 with translation 5 pages.
(Continued)

*Primary Examiner* — Michael J Brown
(74) *Attorney, Agent, or Firm* — RatnerPrestia

(57) ABSTRACT

Provided is a numerical controller capable of calculating an optimum feed rate in machining in which cutting is performed in a different direction from a direction of a spindle axis. The numerical controller includes a tool data storage unit for storing tool data related to a tool attached to the spindle axis, a command analyzer for reading and analyzing a command block from the machining program, and generating movement command data for relatively moving the spindle axis with respect to the workpiece and spindle axis rotation command data for rotating the spindle axis, and a cutting speed controller for calculating a recommended cutting feed rate of the spindle axis based on the tool data of the tool, and clamping a cutting feed rate of the spindle axis included in the movement command data at the recommended cutting feed rate when the cutting feed rate of the spindle axis is larger than the recommended cutting feed rate.

4 Claims, 7 Drawing Sheets

(51) Int. Cl.
  *B23Q 15/007* (2006.01)
  *B23Q 15/08* (2006.01)
  *B23Q 15/22* (2006.01)

(58) Field of Classification Search
  CPC ........... G05B 2219/45044; G05B 2219/45145;
          G05B 19/19; G05B 2219/37077; G05B
          2219/37347; B23Q 15/007; B23Q 15/08;
          B23Q 15/22
  USPC .................................. 700/159, 160, 186, 190
  See application file for complete search history.

(56) References Cited

U.S. PATENT DOCUMENTS

| | | | | |
|---|---|---|---|---|
| 2004/0258495 | A1* | 12/2004 | Kakino | G05B 19/00 409/132 |
| 2007/0046238 | A1* | 3/2007 | Xu | G05B 19/4163 318/571 |
| 2016/0085231 | A1 | 3/2016 | Fujii | |

FOREIGN PATENT DOCUMENTS

| | | |
|---|---|---|
| JP | H0839396 A | 2/1996 |
| JP | 10202471 A | 8/1998 |
| JP | H11129141 A | 5/1999 |
| JP | 11327624 A | 11/1999 |
| JP | 2016-066201 A | 4/2016 |

OTHER PUBLICATIONS

Notification of Reasons for Refusal for Japanese Application No. 2017-112928, dated Nov. 6, 2018, with translation, 7 pages.

* cited by examiner

M : ROTATION DIRECTION OF SPINDLE AXIS
Q : CUTTING FEED DIRECTION
D : ONE-BLADE FEED RATE

NUMERICAL CONTROLLER

CROSS-REFERENCE TO RELATED APPLICATIONS

This application is a new U.S. Patent Application that claims benefit of Japanese Patent Application No. 2017-059913, filed Mar. 24, 2017, and Japanese Patent Application No. 2017-112928, filed Jun. 7, 2017, the disclosure of these applications are being incorporated herein by reference in their entirety for all purposes.

BACKGROUND OF THE INVENTION

1. Field of the Invention

This invention relates to a numerical controller, and particularly relate to a numerical controller that controls a feed rate based on a machining condition of a cutting tool.

2. Description of the Related Art

Such as grooving, free-form surface machining, side milling, incline machining, etc., with using a machine tool, there is a machining method of cutting a workpiece in a different direction from a direction of the spindle axis, to which a tool such as a milling tool, an end mill tool, etc. is attached, (Japanese Patent Laid-Open No. 2016-066201). For example, in side grooving using an end mill tool 2, a groove is machined by performing cutting feed on the end mill tool 2 attached to the spindle axis and rotated in a direction substantially orthogonal to the direction of the spindle axis as illustrated in FIG. 4 or performing cutting feed on the end mill tool 2 attached to the spindle axis and rotated parallel to a surface of a workpiece in a state of being cut deep into the workpiece as illustrated in FIG. 5. In addition, in ramping grooving using the end mill tool 2, as illustrated in FIG. 6, a groove is formed by performing cutting feed on the end mill tool 2 attached to the spindle axis and rotated such that the end mill tool 2 cuts deep into a surface of a workpiece on a slant.

In free-form surface machining using a ball end mill tool 4, as illustrated in FIG. 7, a curved surface is machined by performing cutting feed on the ball end mill tool 4 attached to a spindle axis and rotated in a different direction from a direction of the spindle axis (for example, a direction along a target free-form surface). In addition, in side milling using the end mill tool 2, as illustrated in FIG. 8, a side surface of a workpiece is machined by performing cutting feed on the end mill tool 2 attached to the spindle axis and rotated parallel to the side surface in a state of being cut into the workpiece.

As described above, most of cutting tools such as milling tools, end mill tools, etc. are provided with one or a plurality of blades on a side surface of the tool, etc. However, regardless of a single blade or a plurality of blades, in the machining method exemplified above, when a cutting operation is observed for only one blade, a workpiece is machined when a blade is brought into contact with the workpiece by rotational motion of a spindle axis (a rotation direction of the spindle axis) and movement in a different direction from a direction of the spindle axis. In particular, in a case of a tool provided with a plurality of blades, a workpiece is machined by each of the blades coming into contact with the workpiece by turns.

Further, for further understanding, milling illustrated in FIG. 9 will be described as an example. In the example of FIG. 9, six blades 6 are provided in a milling tool 5, and the blades 6 rotate in a rotation direction M of a spindle axis by rotational motion of the spindle axis. In addition, the milling tool 5 moves in a movement direction Q different from a direction of the spindle axis when a movement axis of the spindle axis is controlled. Further, when the blades 6 included in the milling tool 5 come into contact with a workpiece 3, the blades 6 move to the outside of the workpiece 3 while cutting the workpiece 3 due to rotational motion of the spindle axis and movement in the movement direction Q different from the direction of the spindle axis. When such operations are continuously performed, milling of the workpiece 3 using the six blades 6 included in the milling tool 5 is established. In such a machining method, a one-blade feed rate D indicating the amount of one-time machining per blade 6 included in the milling tool 5 may be calculated by Equation 1 below using the number of blades 6 included in the milling tool 5, the number of revolutions per unit time in the rotation direction M of the spindle axis, and a cutting feed rate in the movement direction Q. The one-blade feed rate may be calculated in the same method in each of the above-described machining methods.

$$\text{ONE-BLADE FEED RATE } D = \frac{\text{CUTTING\_FEED\_RATE [m/min]}}{\text{NUMBER OF BLADES} \times \text{NUMBER OF REVOLUTIONS OF SPINDLE AXIS [min}^{-1}\text{]}} \qquad \text{[Equation 1]}$$

One-blade feed rate D
Cutting feed rate
Number of blades×Number of revolutions of the spindle axis A recommended value set by a tool maker for each tool is provided for the one-blade feed rate of the tool, and an operator sets a machining condition including the cutting feed rate and the number of revolutions of the spindle axis while considering all factors related to cutting such as the recommended value of the one-blade feed rate described in a catalog of the tool maker, a machined shape of the workpiece, machining accuracy, a used machine, rigidity of tooling, etc. Here, when the operator erroneously sets the machining condition, and thus the one-blade feed rate exceeds the recommended value as a result, a decrease in machining quality of the workpiece, a drastic reduction in tool life, and damage to the tool may be caused.

As described above, at the time of determining the feed rate, the number of revolutions of the spindle axis, etc., the operator needs to be conscious of a recommended value of a cutting condition of the tool. However, there is a possibility of setting a machining condition which is not valid (does not satisfy the recommended value of the cutting condition) at the time of creating a new machining program. In addition, in a case of changing to a tool having the same shape (different coating and maker) with respect to an existing program, there is a possibility that, as a result of performing machining without changing the machining condition without checking a recommended value of a cutting condition of a new tool, machining not satisfying the recommended value of the cutting condition of the tool may be performed. Further, there is a possibility of performing machining not satisfying the recommended value of the cutting condition of the tool since the operator changes the number of revolutions of the spindle axis before machining or changes the number of revolutions of the spindle axis by operating an override, etc. during machining.

SUMMARY OF THE INVENTION

In this regard, an object of the invention is to provide a numerical controller capable of calculating an optimum feed rate in machining in which cutting is performed in a different direction from a direction of a spindle axis.

In the invention, the above-mentioned problem is solved by providing the numerical controller with a function of automatically calculating a feed rate by the controller from information about the number of revolutions of the spindle axis, one-blade feed, and the number of blades.

Further, an aspect of the invention is a numerical controller for controlling a machine tool including a spindle axis based on a machining program to relatively move the spindle axis with respect to a workpiece, thereby performing cutting in a different direction from a direction of the spindle axis, including a tool data storage unit for storing tool data related to a tool attached to the spindle axis, a command analyzer for reading and analyzing a command block from the machining program, and generating movement command data for relatively moving the spindle axis with respect to the workpiece and spindle axis rotation command data for rotating the spindle axis, and a cutting speed controller for calculating a recommended cutting feed rate of the spindle axis based on the tool data of the tool, and clamps a cutting feed rate of the spindle axis included in the movement command data at the recommended cutting feed rate when the cutting feed rate of the spindle axis is larger than the recommended cutting feed rate.

According to the invention, it is possible to execute the machining program at an appropriate cutting feed rate without calculating the cutting feed rate based on the recommended value of the cutting condition of the tool, and to use the program without changing the cutting feed rate even in a tool (different type and maker) other than a tool presumed at the time of creating the machining program. Further, when the number of revolutions of the spindle axis is changed, a feed rate command may not be changed. For this reason, it is possible to reduce labor or error of an operator.

BRIEF DESCRIPTION OF THE DRAWINGS

The above-described object and characteristic of the invention and other objects and characteristics will be clear from description of embodiments below with reference to accompanying drawings. In the drawings.

DETAILED DESCRIPTION OF THE PREFERRED EMBODIMENTS

Hereinafter, a configuration example of a numerical controller for implementing the invention will be described. However, a configuration of the numerical controller of the invention is not limited to the example below, and it is possible to employ any configuration when the configuration can realize an object of the invention.

Figure 1:
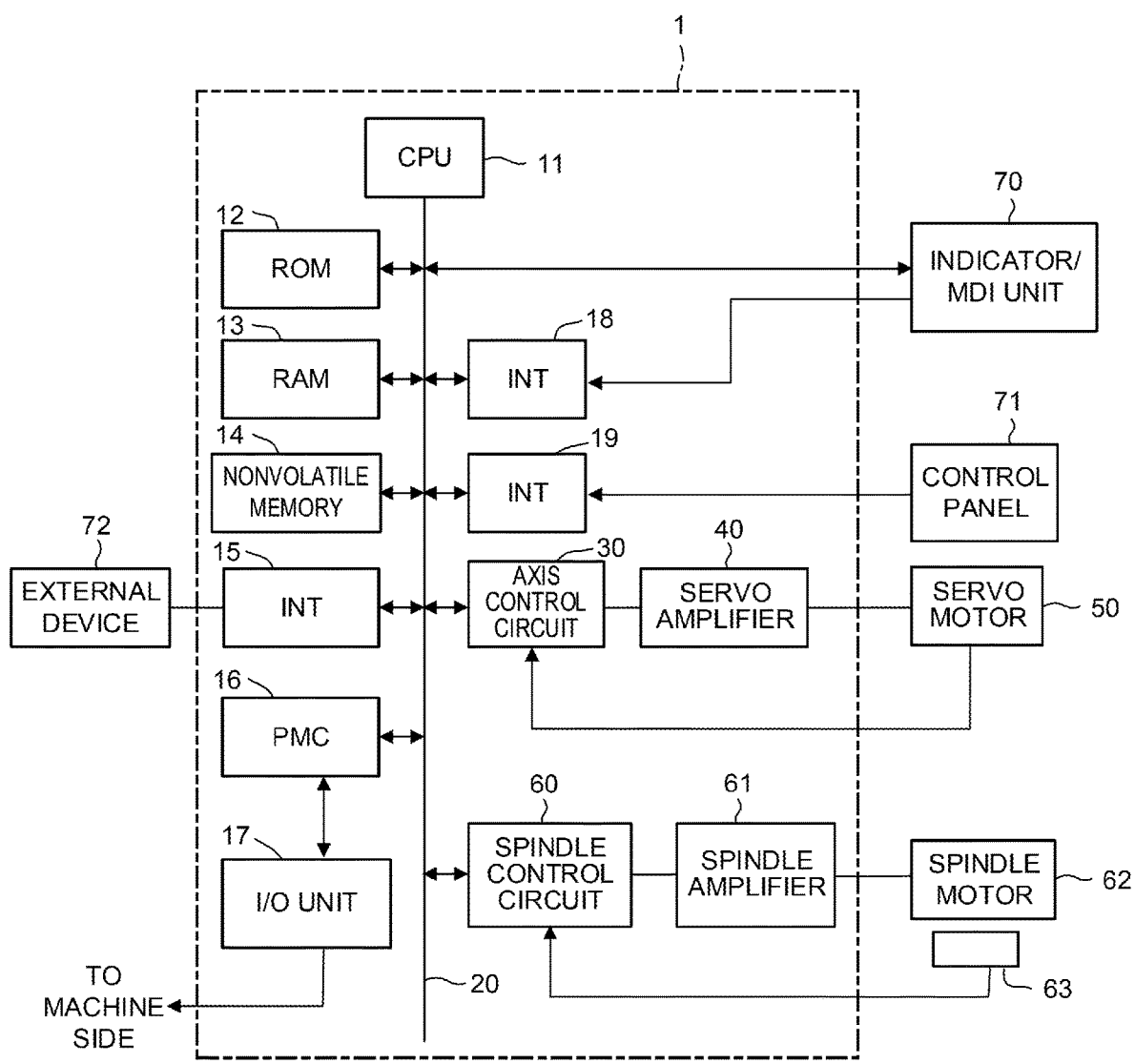
FIG. 1 is a schematic hardware block diagram illustrating main parts of a numerical controller according to an embodiment and a machining device driven and controlled by the numerical controller.

FIG. 1 is a schematic hardware block diagram illustrating main parts of a numerical controller according to an embodiment and a machining device driven and controlled by the numerical controller. A central processing unit (CPU) 11 included in the numerical controller 1 according to the present embodiment corresponds to a processor that controls the numerical controller 1 as a whole. The CPU 11 reads a system program stored in a read only memory (ROM) 12 via a bus 20, and controls the entire numerical controller 1 according to the system program. A random access memory (RAM) 13 stores temporary calculation data, display data, various data input by an operator via an indicator/multiple document interface (MDI) 70 described below, etc.

A nonvolatile memory 14 is configured as a memory that is kept in a storage state even when a power supply of the numerical controller 1 is turned OFF, for example, by being backed up by a battery (not illustrated). In addition to a machining program read via an interface 15 or a machining program input via the indicator/MDI unit 70 described below, the nonvolatile memory 14 stores tool data including a recommended value of a cutting condition of a tool used for machining, etc. The nonvolatile memory 14 further stores a program for a machining program operation processing program used for operating the machining program, etc., and these programs are loaded in the RAM 13 during execution. In addition, various system programs (including a system program for calculating a cutting feed rate) for executing processing of an edit mode, etc. used for creating and editing the machining program are written to the ROM 12 in advance.

The interface 15 is an interface for connecting the numerical controller 1 to an external device 72 such as an adapter. The machining program, various parameters, etc. are read from the external device 72 side. In addition, the machining program emitted in the numerical controller 1 may be stored in external storage device via the external device 72. A programmable machine controller (PMC) 16 outputs a signal to auxiliary equipment of the machining device (for example, an actuator such as a robotic hand for tooling exchange) through an I/O unit 17 using a sequence program embedded in the numerical controller 1, and performs a control operation. In addition, the PMC 16 receives a signal of various switches of a control panel disposed in a main body of the machining device, performs necessary signal processing, and then forwards the signal to the CPU 11.

The indicator/MDI unit 70 is a manual data input device including a display, a keyboard, etc., and an interface 18 receives a command and data from the keyboard of the indicator/MDI unit 70, and forwards the received command and data to the CPU 11. An interface 19 is connected to a control panel 71 including a manual pulse generator, etc. used when each axis is manually driven.

An axis control circuit 30 for controlling an axis included in the machining device receives a movement command amount for the axis from the CPU 11, and outputs a command for the axis to a servo amplifier 40. The servo amplifier 40 receives this command and drives a servo motor 50 that moves the axis included in the machining device. The servo motor 50 of the axis incorporate a position/speed detector, feed a position/speed feedback signal from the position/speed detector back to the axis control circuit 30, and perform a position/speed feedback control operation. The hardware block diagram of FIG. 1 illustrates one axis control circuit 30, one servo amplifier 40, and the one servo motor 50. However, in practice, axis control circuits 30, servo amplifiers 40, and servo motors 50, the numbers of which are the same as the number of axes included in the machine tool to be controlled, are prepared.

A spindle control circuit 60 receives a spindle axis rotation command to the machining device, and outputs a spindle speed signal to a spindle amplifier 61. The spindle amplifier 61 receives the spindle speed signal to rotate a spindle motor 62 of the machining device at a commanded rotation speed, thereby driving the tool.

A position coder 63 is coupled to the spindle motor 62, the position coder 63 outputs a feedback pulse in synchronization with rotation of a spindle axis, and the feedback pulse is read by the CPU 11.

Figure 2:
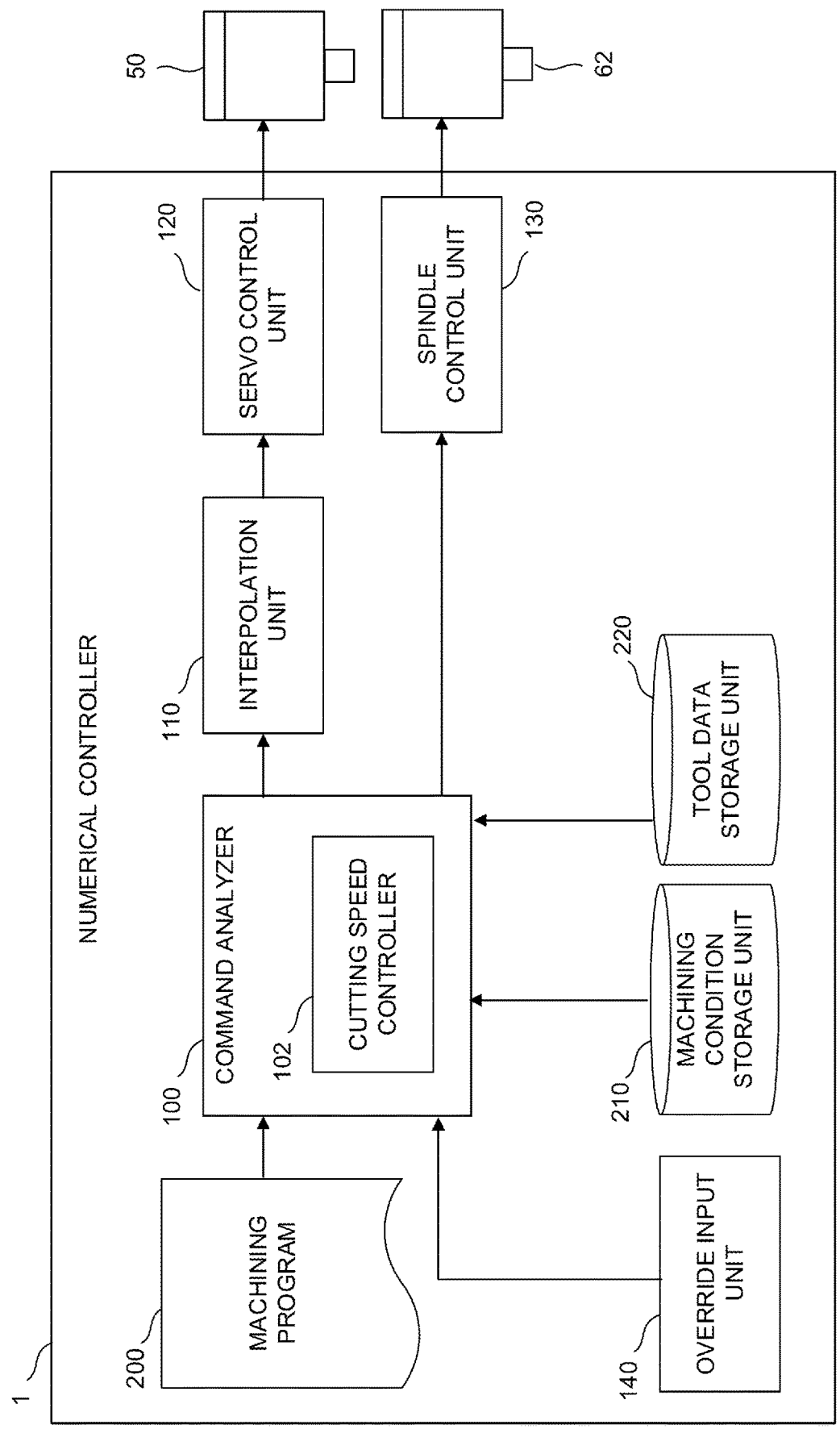
FIG. 2 is a schematic functional block diagram of the numerical controller according to the embodiment.

FIG. 2 is a schematic functional block diagram of the numerical controller according to the embodiment of the invention in a case in which a system program for implementing a cutting speed control function is installed in the numerical controller 1 illustrated in FIG. 1. Each functional block illustrated in FIG. 2 is implemented when the CPU 11 included in the numerical controller 1 illustrated in FIG. 1 executes a system program for calculating a cutting feed rate and controls an operation of each unit of the numerical controller 1. The numerical controller 1 of the present embodiment includes a command analyzer 100, an interpolation unit 110, a servo control unit 120, and an override input unit 140. In addition, a machining condition storage unit 210 that stores a machining condition set in the numerical controller 1 and a tool data storage unit 220 that stores tool data related to a tool used for machining are provided on the nonvolatile memory 14.

The command analyzer 100 successively reads command blocks included in a machining program 200 from the nonvolatile memory 14, analyzes the read command blocks, and calculates movement command data including a command value F of a feed rate of the spindle axis or spindle axis rotation command data including a command value S of the number of revolutions of the spindle axis. When the command value S of the number of revolutions of the spindle axis is not included in the command blocks by the machining program 200, the command analyzer 100 uses a value of the number of revolutions of the spindle axis set in advance in the machining condition storage unit 210, etc. In addition, when an override value with respect to the feed rate of the spindle axis or an override value with respect to the number of revolutions of the spindle axis is input from the override input unit 140, the command analyzer 100 multiplies the override value by the calculated command value F of the feed rate of the spindle axis or the calculated command value S of the number of revolutions of the spindle axis.

The command analyzer 100 includes a cutting speed controller 102 that controls the feed rate of the spindle axis at the time of performing cutting feed. The cutting speed controller 102 refers to tool data of a tool used for current machining stored in the tool data storage unit 220 and calculates a recommended cutting feed rate Vc of the spindle axis based on the referenced tool data. For example, the recommended cutting feed rate Vc of the spindle axis calculated by the cutting speed controller 102 may be calculated by Equation 2 below based on the number of revolutions S of the spindle axis calculated by the command analyzer 100, a recommended value $D_r$ of one-blade feed of the tool included in the tool data, and the number of blades N of the tool.

$$Vc[m/\text{min}] = Dr[m] \times N \times S[\text{min}^{-1}] \quad \text{[Equation 2]}$$

Vc: Recommended cutting feed rate
Dr: Recommended one-blade feed rate
N: Number of blades of tool
S: rotation speed of spindle Further, when the command value F of the feed rate of the spindle axis calculated by the command analyzer 100 exceeds the recommended cutting feed rate Vc at the time of performing a control operation based on a cutting feed command during machining, the cutting speed controller 102 clamps the command value F of the feed rate of the spindle axis at the recommended cutting feed rate Vc.

The interpolation unit 110 generates interpolation data obtained by interpolating a point on a command path commanded by the movement command data in an interpolation period based on the command value F of the feed rate of the spindle axis calculated by the command analyzer 100 (and clamped by the cutting speed controller 102).

The servo control unit 120 controls the servo motor 50 that drives each axis of a machine to be controlled based on the interpolation data generated by the interpolation unit 110.

In addition, a spindle control unit 130 controls the spindle motor 62 that rotates the spindle axis of the machine to be controlled based on the spindle axis rotation command data.

The override input unit 140 receives the override value with respect to the feed rate of the spindle axis or the override value with respect to the number of revolutions of the spindle axis input from the control panel 71, etc. to the numerical controller 1 by the operator operating an override switch (not illustrated) provided in the control panel 71, etc. and outputs the received override value to the command analyzer 100.

Figure 3:
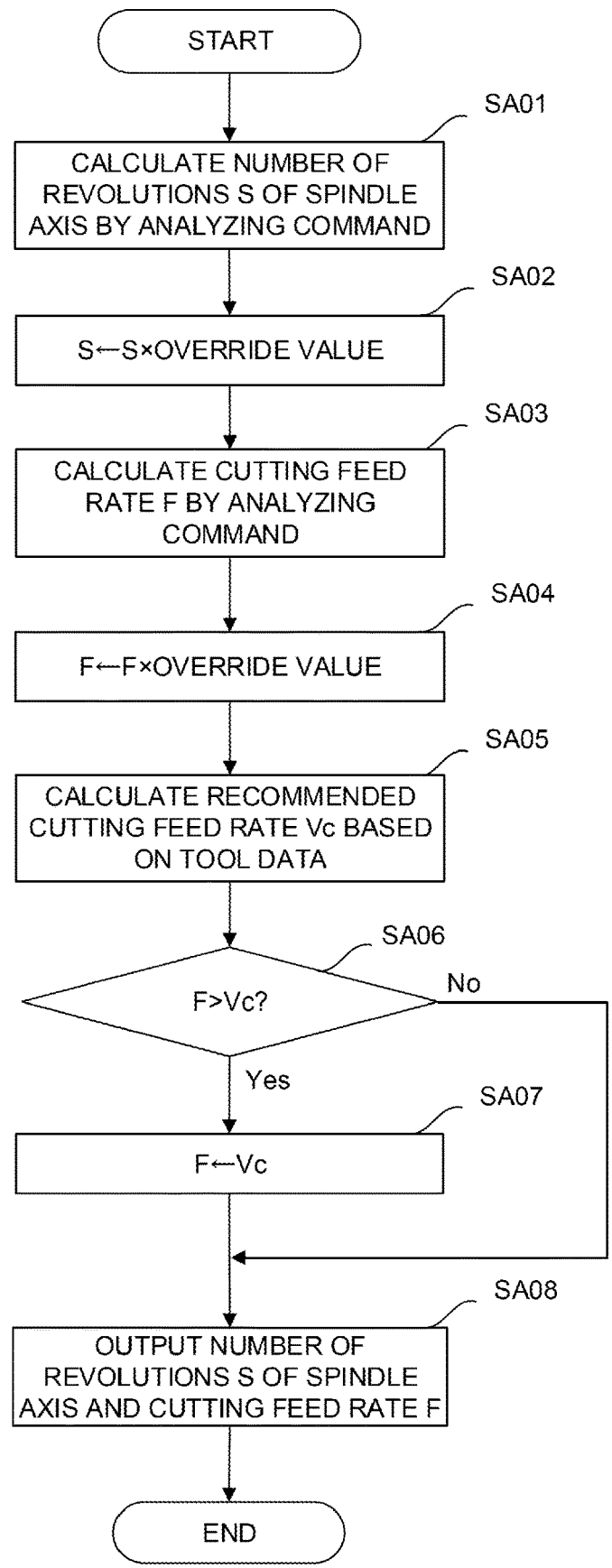
FIG. 3 is a schematic flowchart illustrating a flow of processing of a cutting speed control.
Figure 4:
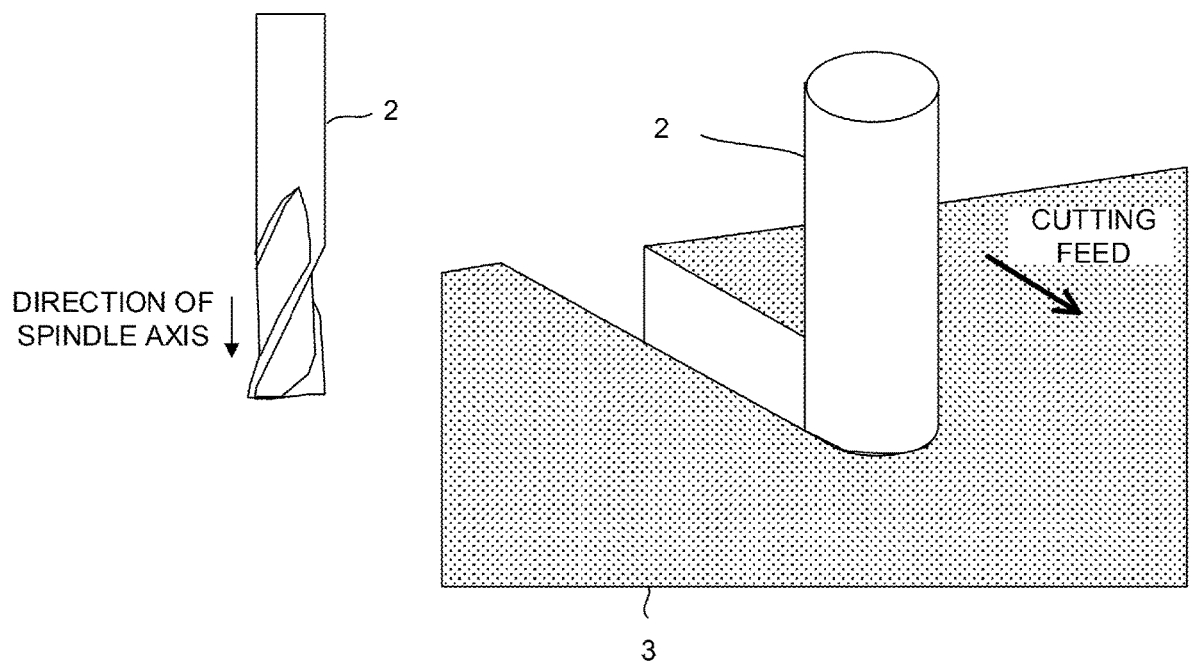
FIG. 4 is a diagram for description of side grooving.
Figure 5:
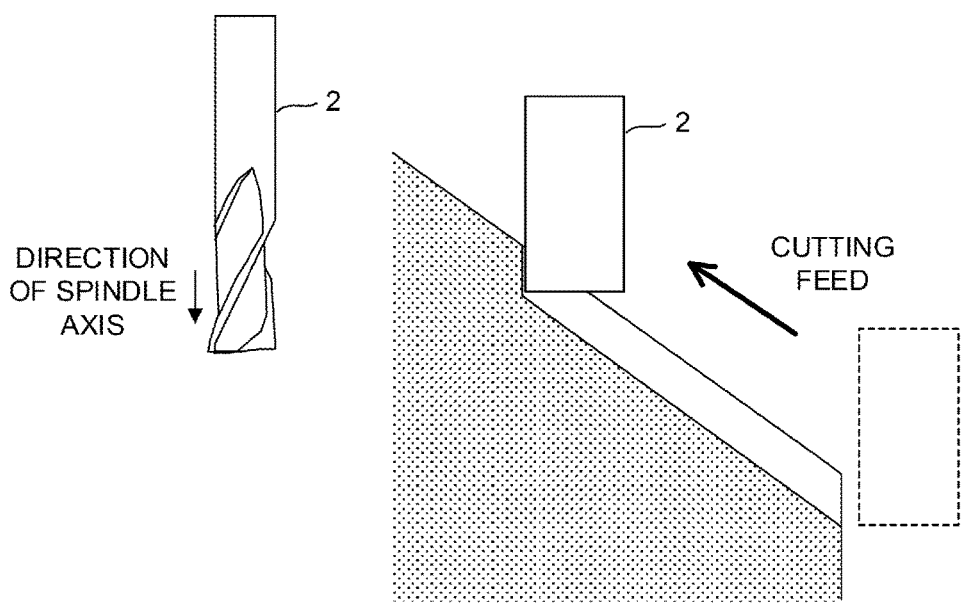
FIG. 5 is a diagram for description of side grooving of a workpiece whose machined surface is inclined.
Figure 6:
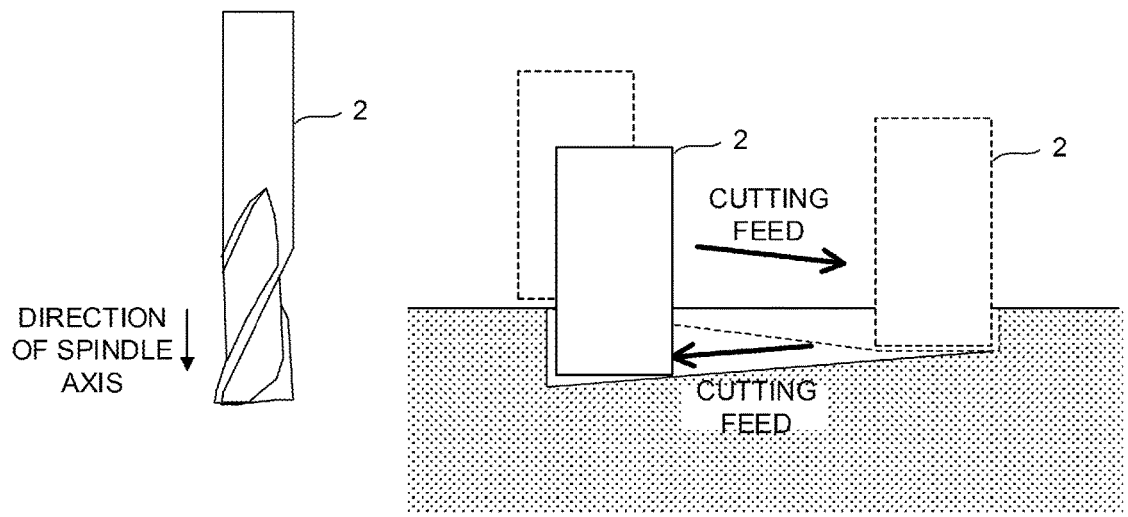
FIG. 6 is a diagram for description of ramping grooving.
Figure 7:
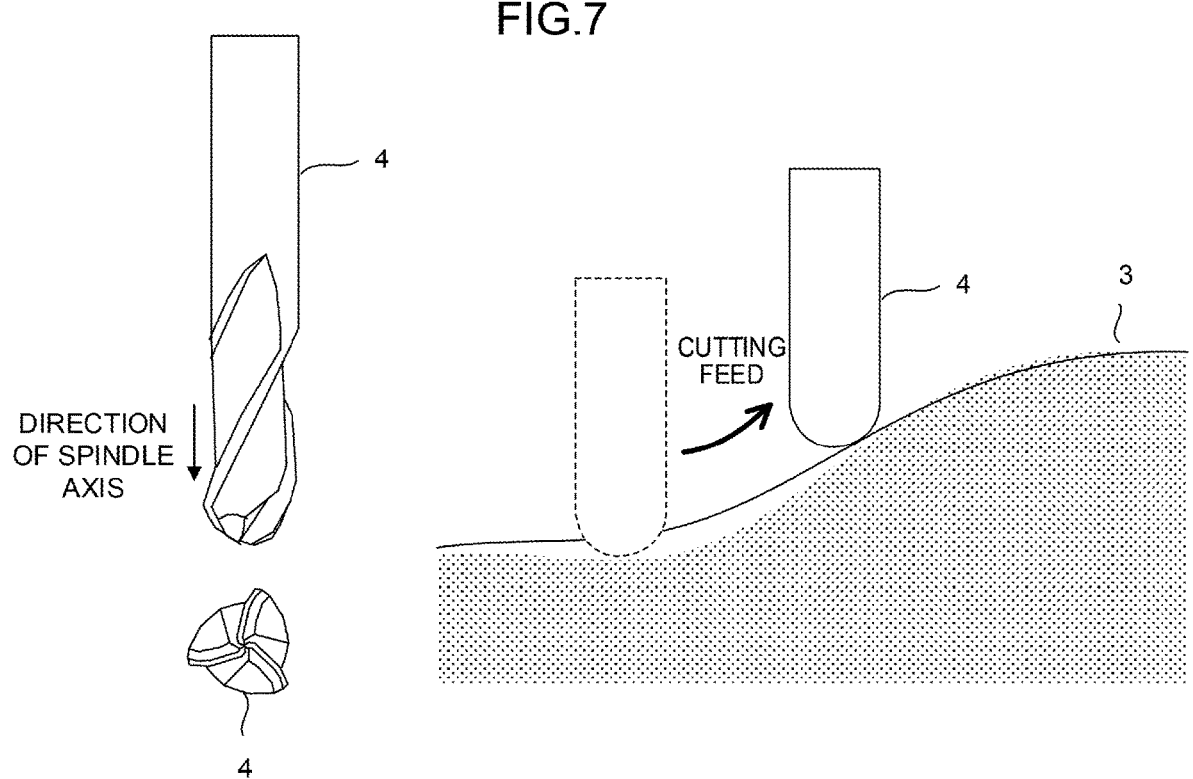
FIG. 7 is a diagram for description of free-form surface machining.
Figure 8:
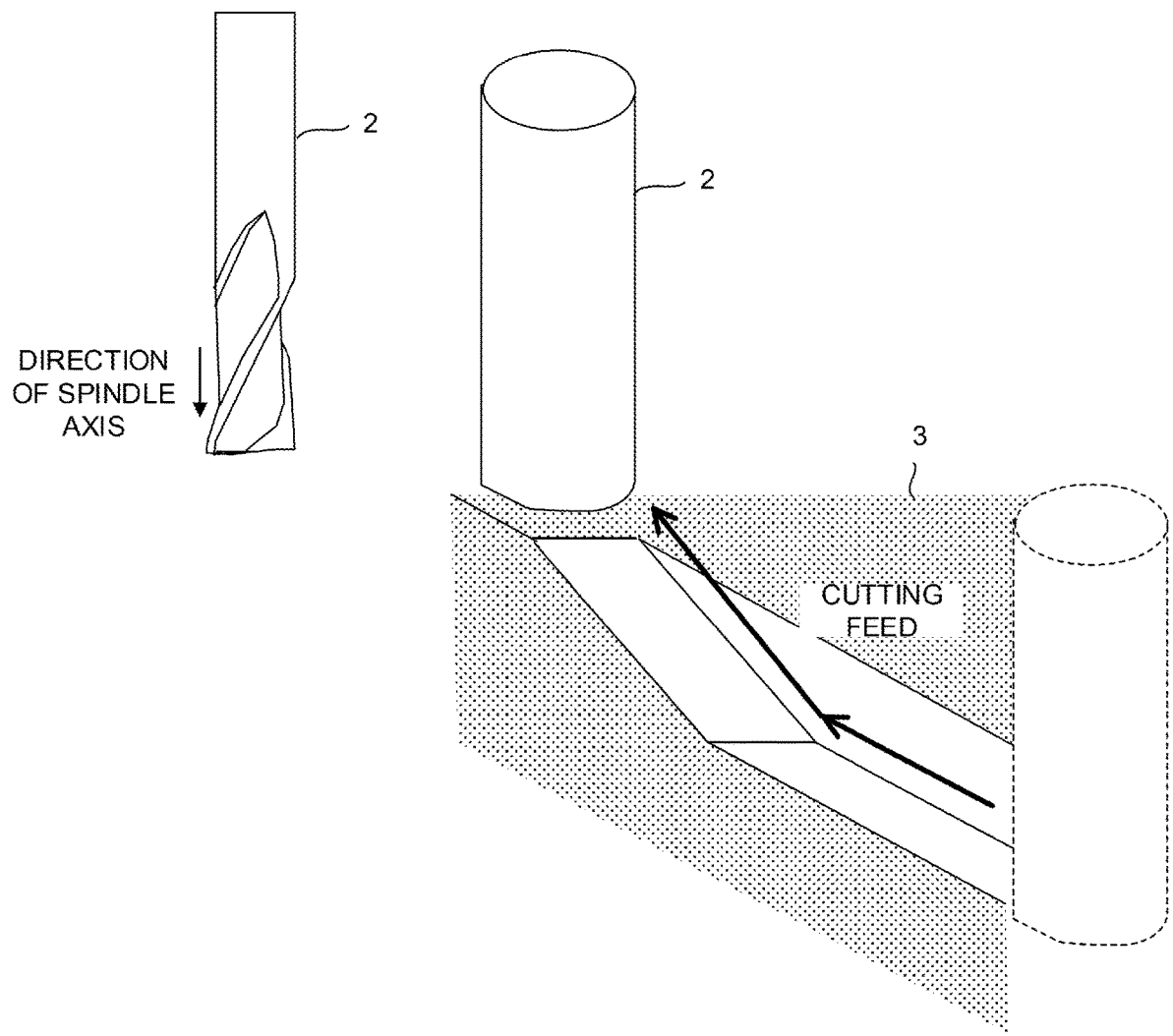
FIG. 8 is a diagram for description of side milling.
Figure 9:
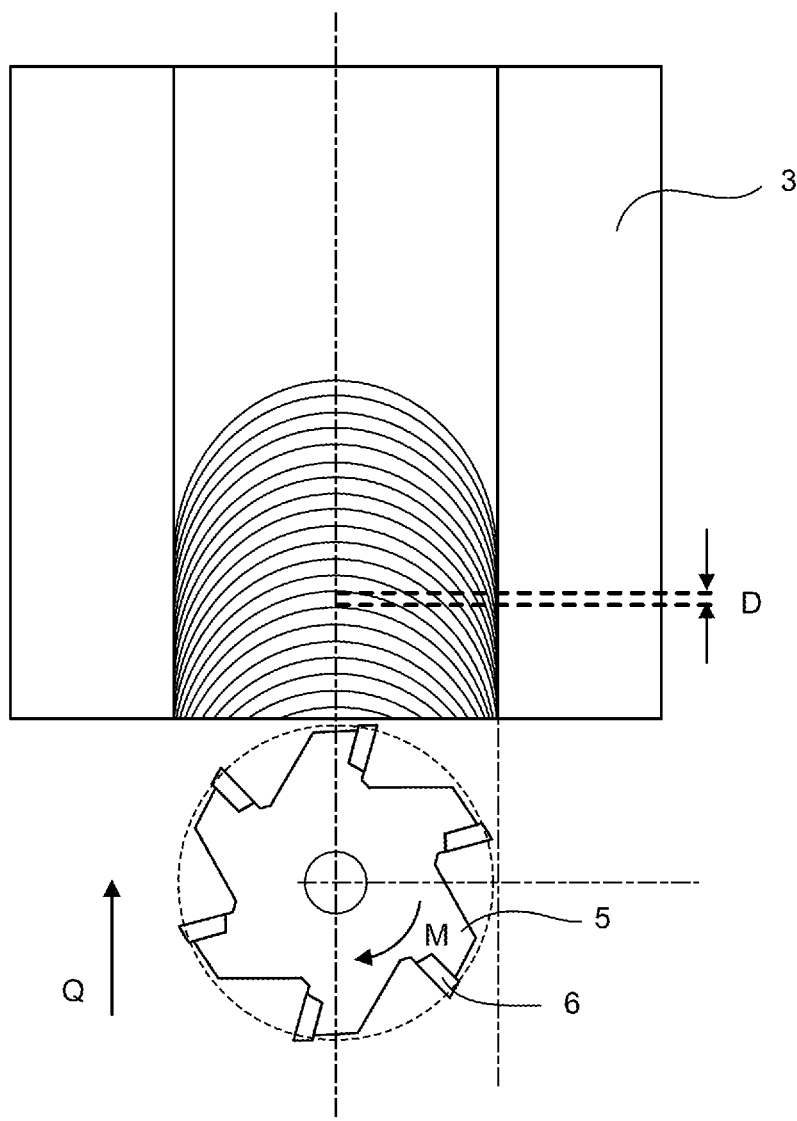
FIG. 9 is a diagram for description of milling.

FIG. 3 is a schematic flowchart of processing executed on the numerical controller 1 illustrated in FIG. 2. A flow of processing illustrated in FIG. 3 shows an operation when a cutting feed is commanded by a command block of the machining program, and processing of an operation based on another command (rapid traverse, etc.) is omitted.

[Step SA01] The command analyzer 100 calculates the command value S of the number of revolutions of the spindle axis by analyzing a command block of the machining program 200.

[Step SA02] When the override value with respect to the number of revolutions of the spindle axis is input from the override input unit 140, the command analyzer 100 multiplies the override value with respect to the number of revolutions of the spindle axis by the command value S of the number of revolutions of the spindle axis calculated in step SA01.

[Step SA03] The command analyzer 100 calculates the command value F of the cutting feed rate of the spindle axis by analyzing the command block of the machining program 200.

[Step SA04] When the override value with respect to the feed rate of the spindle axis is input from the override input unit 140, the command analyzer 100 multiplies the override value with respect to the feed rate of the spindle axis by the command value F of the cutting feed rate of the spindle axis calculated in step SA03.

[Step SA05] The cutting speed controller 102 refers to tool data of a tool used for current machining stored in the tool data storage unit 220 and calculates the recommended cutting feed rate Vc of the spindle axis based on the referenced tool data.

[Step SA06] The cutting speed controller 102 compares the command value F of the cutting feed rate of the spindle axis calculated by the command analyzer 100 with the recommended cutting feed rate Vc of the spindle axis calculated in step SA05. When the command value F of the cutting feed rate of the spindle axis is larger than the recommended cutting feed rate Vc of the spindle axis, the operation proceeds to step SA07. Otherwise, the operation proceeds to step SA08.

[Step SA07] The cutting speed controller 102 clamps the command value F of the cutting feed rate of the spindle axis at the recommended cutting feed rate Vc of the spindle axis (sets the command value F of the cutting feed rate of the spindle axis to the recommended cutting feed rate Vc of the spindle axis).

[Step SA08] The command analyzer 100 generates and outputs the movement command data including the command value F of the cutting feed rate of the spindle axis and the spindle axis rotation command data including the command value S of the number of revolutions of the spindle axis.

According to the above configuration, it is possible to execute the machining program at an appropriate cutting feed rate without calculating the recommended value of the cutting feed rate based on the recommended value of the cutting condition of the tool, and to use the program without changing the cutting feed rate even in a tool (different type and maker) other than a tool presumed at the time of creating the machining program. Further, even when the machining program is rewritten before machining or the override switch is operated during machining to change the number of revolutions of the spindle axis, the cutting feed rate is automatically clamped at a recommended cutting feed rate value calculated from the recommended value of the cutting condition of the tool, and thus the operator may not change a feed rate command.

The invention corresponds to a tool provided with one or a plurality of blades and can be applied to general machining in which the respective blades cut a workpiece by turns (intermittently in the case of one blade) by rotation of the spindle axis and movement of the spindle axis according to the movement axis (with respect to the workpiece). In addition to side grooving, ramping grooving, free-form surface machining, side milling, and incline machining, various machining methods such as face milling, plane milling, helical machining, etc. are present as such a machining method. However, regardless of the machining methods, the one-blade feed rate may be appropriately controlled by applying the invention.

As a modification of the numerical controller of the present embodiment, the cutting speed controller 102 may automatically set the cutting feed rate F to the recommended cutting feed rate Vc when the cutting feed rate is not commanded in the machining program.

According to the modification, even when the operator does not command the cutting feed rate in the machining program, the cutting speed controller 102 sets the recommended cutting feed rate Vc calculated based on the tool data of the currently used tool as the command value F of the feed rate of the spindle axis, and thus it is possible to reduce labor or error of the operator.

As another modification of the numerical controller of the present embodiment, when the command value F of the cutting feed rate of the spindle axis commanded in the machining program (and overridden based on the operation of the override switch) is clamped at the recommended cutting feed rate Vc calculated based on the tool data of the currently used tool, the cutting speed controller 102 may notify the operator of clamping of the speed by display of the indicator/MDI unit 70 or a lamp, sound, etc. of the control panel 71.

According to the modification, it is possible to confirm that the command value F of the cutting feed rate of the spindle axis commanded in the machining program (and overridden based on the operation of the override switch) is clamped and confirm the clamped speed (the recommended cutting feed rate Vc).

As another modification of the numerical controller of the present embodiment, when the command value F of the cutting feed rate commanded in the machining program is less than the recommended cutting feed rate Vc calculated based on the tool data of the currently used tool, the cutting speed controller 102 may notify the operator of the information by display of the indicator/MDI unit 70 or a lamp, sound, etc. of the control panel 71.

According to the modification, it is possible to confirm that the command value F of the cutting feed rate of the spindle axis commanded in the machining program can be changed to a larger value and confirm a recommended upper limit of the cutting feed rate of the spindle axis (the recommended cutting feed rate Vc).

As another modification of the numerical controller of the present embodiment, when the cutting feed rate commanded in the machining program is less than the recommended cutting feed rate Vc calculated based on the tool data of the currently used tool, the cutting speed controller 102 may automatically set the command value F of the cutting feed rate of the spindle axis to the recommended cutting feed rate Vc.

According to the modification, when the command value F of the cutting feed rate of the spindle axis commanded in the machining program can be changed to a larger value, the value is automatically increased to a recommended upper limit speed, and thus it is possible to reduce a cycle time of machining.

Even though the embodiments of the invention have been described above, the invention is not limited to the above-described examples of the embodiments, and may be implemented in various modes by making appropriate changes.

The invention claimed is:

1. A numerical controller for controlling a machine tool including a spindle axis based on a machining program to relatively move the spindle axis with respect to a workpiece, thereby performing cutting in a different direction from a direction of the spindle axis, the numerical controller comprising:
    a tool data storage unit for storing tool data related to a tool attached to the spindle axis, the tool data including at least a recommended value of one-blade feed of the tool and a number of blades of the tool;
    a command analyzer for reading and analyzing a command block from the machining program, and generating movement command data for relatively moving the spindle axis with respect to the workpiece and spindle axis rotation command data for rotating the spindle axis; and
    a cutting speed controller for calculating a recommended cutting feed rate of the spindle axis by using at least the recommended value of one-blade feed of the tool and the number of the blades of the tool included in the tool data of the tool, and clamping a cutting feed rate of the spindle axis included in the movement command data at the recommended cutting feed rate when the cutting feed rate of the spindle axis is larger than the recommended cutting feed rate.

2. The numerical controller according to claim 1, wherein when the cutting feed rate is not commanded by a command block of the machining program, the cutting speed controller sets the cutting feed rate of the spindle axis to the recommended cutting feed rate.

3. The numerical controller according to claim 1, wherein when the cutting feed rate commanded by a command block of the machining program is smaller than the recommended cutting feed rate, the cutting speed controller sets the cutting feed rate of the spindle axis to the recommended cutting feed rate.

4. The numerical controller according to claim 1, wherein when the cutting speed controller changes the cutting feed rate of the spindle axis, an operator is notified that the cutting feed rate of the spindle axis has been changed.

* * * * *